Jan. 31, 1928.  1,658,019
J. T. LUSCOMBE ET AL
WEARING ELEMENT FOR CROSSHEADS
Filed Sept. 24. 1926   2 Sheets-Sheet 1
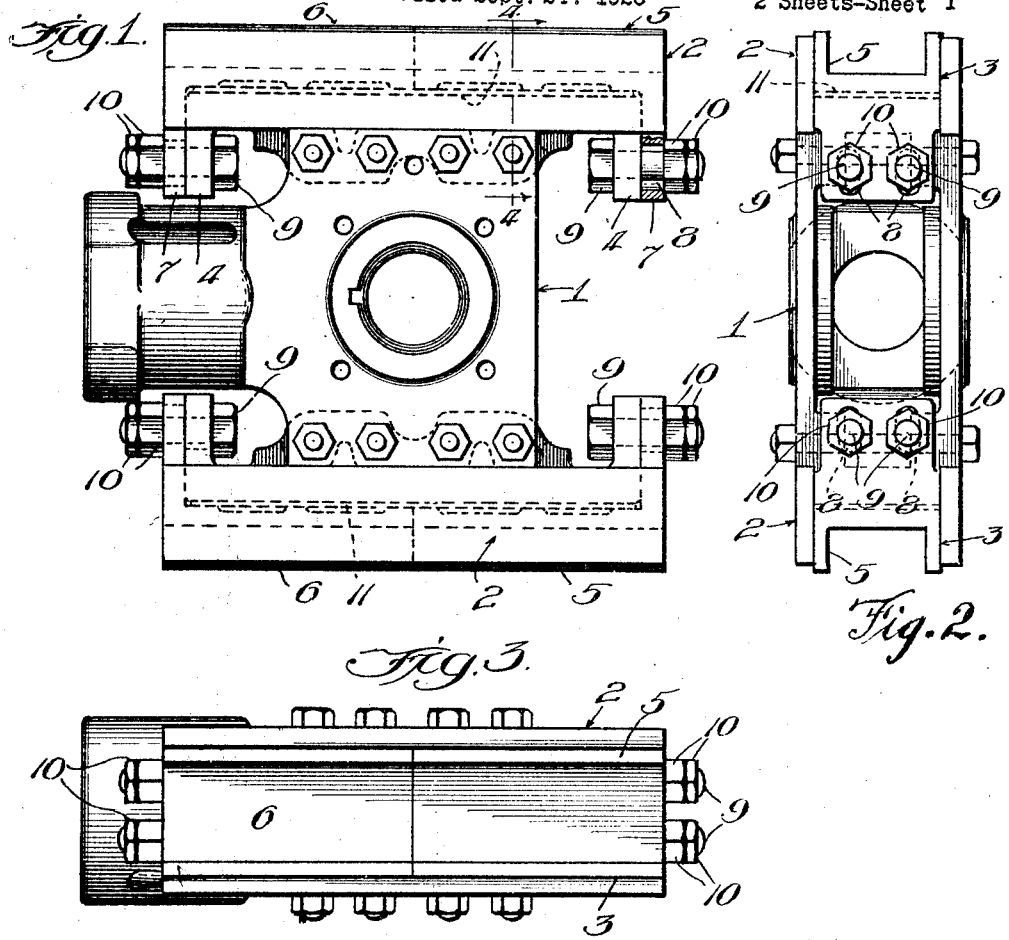
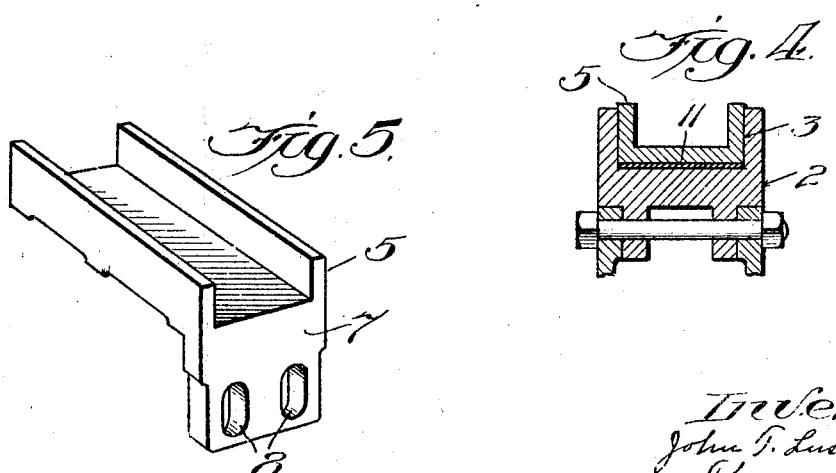
Inventors:
John T. Luscombe and
Thomas Windle,
By Wm. F. Freudenreich,
Atty.

Jan. 31, 1928.
J. T. LUSCOMBE ET AL
1,658,019
WEARING ELEMENT FOR CROSSHEADS
Filed Sept. 24, 1926      2 Sheets-Sheet 2
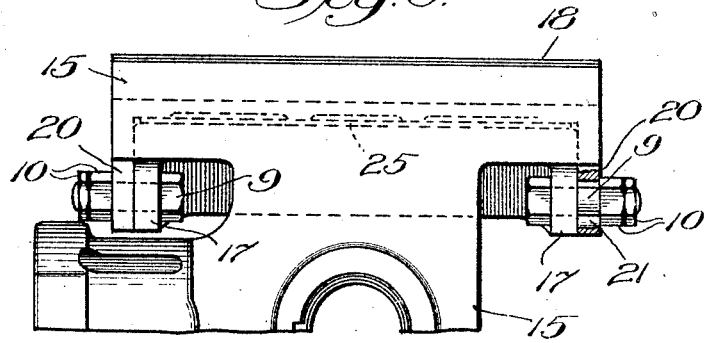
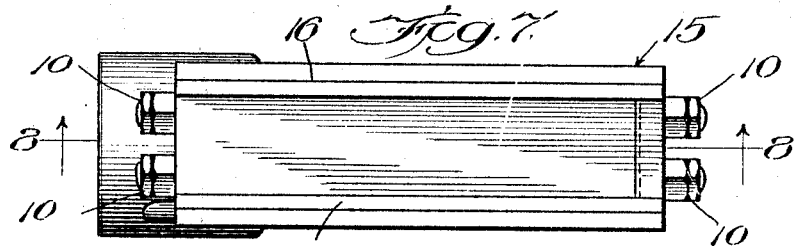
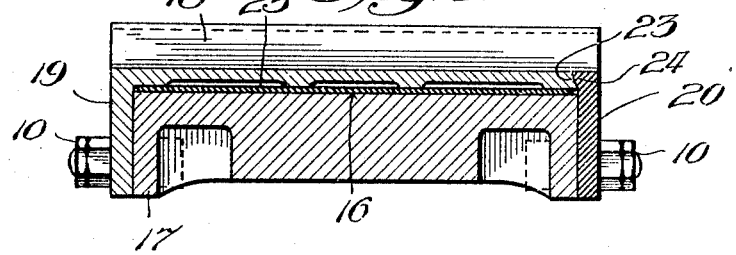
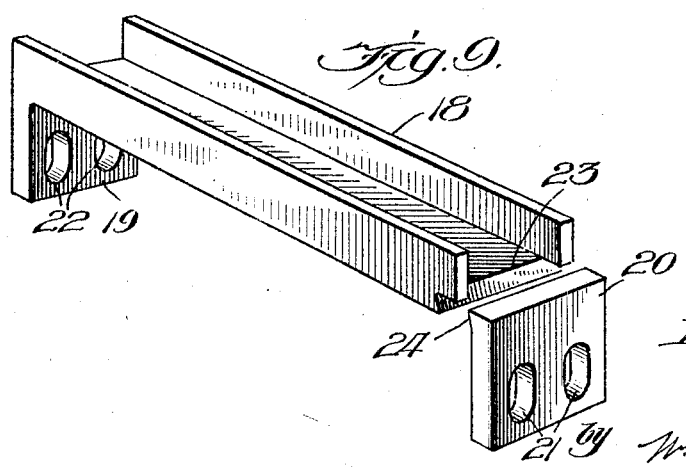

Patented Jan. 31, 1928.

1,658,019

UNITED STATES PATENT OFFICE.

JOHN T. LUSCOMBE, OF LA GRANGE, AND THOMAS WINDLE, OF DECATUR, ILLINOIS; SAID WINDLE ASSIGNOR TO SAID LUSCOMBE.

WEARING ELEMENT FOR CROSSHEADS.

Application filed September 24, 1926. Serial No. 137,418.

There is comparatively rapid wear of those surfaces of a locomotive cross head engaged with the guides and therefore frequent compensation for wear must be made. It was long ago suggested to provide cross heads with adjustable wearing members movable outwardly, as wear occurs, by means of cooperating inclined surfaces; but this expedient has never been found practicable. Thus it has been suggested to employ long wedge elements left free at one end so that a whipping action takes place that breaks them at the ends where they are laid rigid, making such a construction valueless. Again, in substantially all constructions employing a wedging action such stresses have been imposed on the studs or bolts that hold the wedge elements, as to cause these studs or bolts to break and, in any event, to loosen sufficiently to allow the wedge elements to become loose. Because of the difficulty of compensating for wear by adjusting the wearing faces on the cross heads, the usual practice has been to adjust the guides toward each other as wear takes place; the adjustment of the guides being a matter that requires great care in order to maintain the proper alignment. Even where this expedient of adjusting the guides is employed, the cross head wears away in time, so that replacement is necessary; and therefore cross heads are commonly made with a permanent center and detachable shoes, so that only the shoes need be replaced after a predetermined amount of wear. These removable shoes must be made large and heavy and the expense of replacing them is therefore great.

The object of the present invention is to provide means for effectively compensating for wear on the guiding surfaces of a cross head, without requiring the replacement of any heavy or expensive parts, without necessitating the disturbance of the guides, and without the use of fastenings or other parts that are subjected to stresses that will loosen them or cause them to break in service.

In carrying out our invention we employ wearing slippers that are fitted into the grooves of a cross head and have flanges resting against wide bearing seats arranged in planes at right angles to the guides; these flanges being adjustably clamped against these bearing faces so as to permit the slippers to be moved from and toward the guides. Initially, the slippers may bottom in the grooves and, as wear takes place, the slippers may be loosened and, after one or more liners or shims have been placed under each shoe, they may again be clamped solidly in place. Liners or shims may be added from time to time until the slippers have become worn to such an extent that they should be replaced. The slippers are preferably anchored by means of studs that lie parallel with the guides, that is with the direction of movement of the cross head, so that the only stresses that come on the studs are tension stresses and these will not be of any considerable magnitude because they need only overcome frictional resistance of the slippers to movement along the guides. These studs pass through slots elongated in a direction at right angles to the guides, so that the flanges on the slippers always are in intimate contact with the bearing faces or seats therefor on the end or ends of the cross head. The present invention is applicable to that style of cross head having the detachable shoes. These shoes, which are made of a special high grade cast iron, may be replaced with lighter shoes of cast steel which need have only structural strength and not bearing qualities. After a cross head has once been equipped with these steel shoes, no further replacement except of the slippers is required. Furthermore, the cast iron shoes may be utilized by welding thereto lugs to serve as the abutments against which the flanges on the slippers are clamped. In original equipment, the cross heads may be made in a single piece, without removable shoes and, because of the absence of machine work and fastenings for detachable shoes, the cross heads will be materially cheaper than the ordinary type, and they may, of course, be made considerably lighter.

The various features of novelty whereby our invention is characterized will hereinafter be pointed out with particularity in the claims; but, for a full understanding of our invention, and of its objects and advantages, reference may be had to the following detailed description taken in connection with the accompanying drawings, wherein:

Figure 1 is a side elevation of a cross head, of the detachable shoe type, equipped with wearing means arranged in accordance with the present invention; Fig. 2 is an end view of the cross head, looking at the right hand end of Fig. 1; Fig. 3 is a top plan view of the head shown in Figs. 1 and 2; Fig. 4 is a section taken on line 4—4 of Fig. 1; Fig. 5 is a perspective view of one-half of one of the two-part wearing slippers; Fig. 6 is a side view of the upper half of a cross head made in one piece and having a somewhat different form of slipper applied thereto; Fig. 7 is a top plan view of a cross head shown in Fig. 6; Fig. 8 is a section taken approximately on line 8—8 of Fig. 7; and Fig. 9 is a perspective view of the slipper employed in Figs. 6 to 8, together with the locking plate for the free end of the slipper.

Referring to Figures 1 to 5 of the drawings, 1 represents a cross head which, as shown, has detachable shoes 2, 2 at the top and the bottom. Each shoe has a wide peripheral groove 3 extending from end to end. At a short distance from each end of each shoe, inwardly from the bottom of the groove, is a lug 4 having a flat outer face arranged at right angles to the long axis of the groove. Within the groove lies a channel-shaped slipper of suitable bearing material, formed in two parts, 5 and 6. The members 5 and 6 are arranged end to end, meeting midway between the ends of the groove. Each of the members 5 and 6 is provided at its outer end with a depending part 7 which, for convenience, we shall term a flange. The flanges are accurately machined on their inner faces so that they will rest flat against the flat outer bearing faces or seats on the lugs 4. Each flange has at least one and preferably two slots 8 cut through the same and arranged at right angles to the plane of the bottom of the trough in the slipper. Bolts 9 pass through the lugs 4 and the slots in the flanges of the slippers. By applying nuts 10 to the outer ends of the bolts, the flanges are clamped solidly against the lugs. Initially the parts are so proportioned that the slippers fit into the grooves in the cross head, resting on the bottoms of the latter. By making the slipper in two parts, each half is comparatively short, so that its free end can never whip about sufficiently to endanger its integrity at the juncture of the same with the holding flange.

When the cross head is in use, the only stresses that come on the bolts are the slight tension stresses necessary to oppose the resistance to movement of the slipper by reason of the friction between the same and the corresponding guide. Therefore there is no danger that the bolts will break or bend or that the nuts will work loose. When wear has taken place, the bolts are loosened, one of the halves of each slipper being completely removed, and a suitable liner or filler 11 is placed in the bottom of the groove. The part of the slipper that was removed is then replaced and the nuts on the bolts are tightened, the conditions being now precisely as they were initially, except that the slippers rest somewhat higher up in the grooves. However, it will be seen that the flanges on the slippers are still in intimate contact with the bearing faces or seats on the lugs, so that the fastenings for the slipper are precisely the same as they were initially. In other words, there is never any exposed length of a stud or bolt between the head and the nuts, and the slipper is never supported simply from a stud or a bolt so that the latter serves as a fulcrum, but it is always clamped solidly against a wide bearing face or seat on the cross head.

In Figures 6 to 9, we have shown the slipper, in another form, applied to a solid cross head. Referring to these figures, 15 represents a cross head of any usual or suitable construction having peripheral grooves 16 similar to grooves 3 and lugs 17 corresponding to the lugs 4. The slipper 18, in this arrangement, is almost as long as the cross head, having at one end a flange 19 to bear against the lug 17 at one end of the head. Secured to the lug at the opposed end of the head is a locking plate 20 having therein elongated slots 21 similar to the slots 22 in the flange 19 and the slots 8 in the slipper as shown in Figures 1 to 5. The plate 20 is deep enough so that it may project into the groove in the periphery of the cross head and engage with the free end of the slipper. The free end of the slipper and the adjacent marginal portion of the plate 20 are preferably so formed that the slipper and the plate will interlock and prevent the free end of the slipper from rising. In the arrangement shown, the extreme edge of the bottom or web of the slipper is beveled, as indicated at 23, and the plate 20 is provided with a beveled projection 24 along the inner side near the upper edge. When the parts are assembled, one end of the slipper is firmly anchored by means of its flange, while the overhanging upper end of the locking plate 20 is drawn tightly against the free end of the bottom or web of the slipper. When wear takes place, the locking plate 20 is detached, the nuts holding the flange 19 are loosened, and one or more liners or shims 25 are inserted underneath the slipper. The nuts holding the flange in place are then screwed tight and the locking plate secured in position; the locking plate being adjustable so as to follow the slipper as the latter is moved to a raised or lowered position in the groove in the cross head. The purpose of the locking plate is to hold the free end of the slipper down so as to avoid any possibility of a whipping action of the comparatively long slipper.

The advantages of the construction shown in Figures 5 to 9 are the same, generally speaking, as those heretofore pointed out in connection with the other form. If the locking plate 20 be omitted, the construction will be somewhat simpler than that shown in Figures 1 to 5, because the slipper will then consist of a single piece and there will be only two holding bolts instead of four. Ordinarily, however, the locking plate 20 will be found useful, as insuring against any possibility of objectionable whipping on the part of the long slipper.

While we have illustrated and described with particularity only two preferred forms of our invention, as applied to a well known type of cross head with detachable shoes, and to a solid cross head, we do not desire to be limited to the particular details thus illustrated and described; but intend to cover all forms and arrangements within the definitions of our invention constituting the appended claims.

We claim:

1. A cross head having an open-ended peripheral groove and a transverse seat inwardly of one end of said groove, the bottom of the groove being parallel with the long axis of the head, a wearing slipper arranged in said groove and having a flange engaged with said seat, and means for adjustably clamping said flange against said seat to hold the slipper at various elevations in the groove.

2. A cross head having an open-ended peripheral groove and a transverse seat inwardly of one end of said groove, the bottom of the groove being parallel with the long axis of the head, a wearing slipper in said groove having a flange engaged with said seat, said flange containing a slot elongated in a direction transverse to the plane of the slipper and a bolt passing through said slot into the cross head.

3. A cross head having a peripheral open-ended groove with parallel side walls and a seat inwardly of one end of the groove and at right angles to the long axis of the groove, the bottom of the groove being parallel with the long axis of the head, a slipper fitting in said groove and having a flange fitting against said seat, and means for clamping said flange to said seat in various positions corresponding to different elevations of the slipper in the groove.

4. A cross head having a peripheral open-ended groove with parallel side walls and a seat inwardly of one end of the groove and at right angles to the long axis of the groove, a slipper fitting into said groove and having a flange engaged with said seat, said flange containing a plurality of parallel slots elongated in directions parallel with the side walls of the slots, studs projecting from said seat through said slots, and nuts on said studs to clamp the flange against the seat.

5. A cross head having a peripheral open-ended groove and transverse seats inwardly of the ends of the groove, a wearing slipper fitting into said groove, said slipper being made in two parts meeting midway between the ends of the grooves, said slipper having at each end a flange engaged with the corresponding seat on the cross head, and means for adjustably clamping said flanges to said seats to permit the shoe to be raised and lowered in the groove.

In testimony whereof, we sign this specification.

JOHN T. LUSCOMBE.
THOMAS WINDLE.